US012585932B1

(12) United States Patent　　(10) Patent No.: US 12,585,932 B1
Carvalho et al.　　(45) Date of Patent: Mar. 24, 2026

(54) BAGGING ADVERSARIAL TRAINING FOR QUESTION ANSWER RANKING

(71) Applicant: Intuit Inc., Mountain View, CA (US)

(72) Inventors: Vitor R. Carvalho, San Diego, CA (US); Sparsh Gupta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 982 days.

(21) Appl. No.: 16/526,933

(22) Filed: Jul. 30, 2019

(51) Int. Cl.
　　*G06N 3/08*　　(2023.01)
　　*G06N 5/02*　　(2023.01)

(52) U.S. Cl.
　　CPC ................. *G06N 3/08* (2013.01); *G06N 5/02* (2013.01)

(58) Field of Classification Search
　　CPC ................................... G06N 5/02; G06N 3/08
　　See application file for complete search history.

(56) References Cited

U.S. PATENT DOCUMENTS

| | | | |
|---|---|---|---|
| 9,064,491 B2 * | 6/2015 | Rachevsky | G06F 18/2411 |
| 11,003,720 B1 * | 5/2021 | Xia | G06N 20/00 |
| 2010/0305731 A1 * | 12/2010 | Masuda | G11B 20/10527 |
| | | | 700/94 |
| 2012/0078873 A1 * | 3/2012 | Ferrucci | G06F 16/3329 |
| | | | 707/E17.014 |
| 2016/0239988 A1 * | 8/2016 | Keil | G06T 11/008 |
| 2019/0057268 A1 * | 2/2019 | Burge | G06V 40/40 |

| | | | |
|---|---|---|---|
| 2019/0340172 A1 * | 11/2019 | McElvain | G06N 5/046 |
| 2019/0355103 A1 * | 11/2019 | Baek | G06T 5/60 |
| 2019/0392587 A1 * | 12/2019 | Nowozin | G06N 3/045 |
| 2020/0012892 A1 * | 1/2020 | Goodsitt | G06K 9/6218 |
| 2020/0265735 A1 * | 8/2020 | Byron | G09B 5/08 |
| 2020/0285898 A1 * | 9/2020 | Dong | G06F 18/40 |
| 2020/0342879 A1 * | 10/2020 | Carbune | H04L 63/00 |
| 2021/0012543 A1 * | 1/2021 | Hein | G06T 11/008 |

OTHER PUBLICATIONS

Wang—Irgan A Minimax Game for Unifying Generative and Descriminative IR Models—2018 (Year: 2018).*
Li—Adaboost with Auto-Evaluation for Conversational Models—2018 (Year: 2018).*
Kotu—Ensemble Modeling—2015 (Year: 2015).*
Tian—Learning to Abstract for Memory-augmented Conversational Response Generation—2019 (Year: 2019).*
(Continued)

*Primary Examiner* — Omar F Fernandez Rivas
*Assistant Examiner* — Shamcy Alghazzy
(74) *Attorney, Agent, or Firm* — DLA PIPER LLP US

(57)　　ABSTRACT

A computer-implemented method is provided to preforming bagging adversarial training for question-answer ranking models using neural networks. The method includes generating first question and answer (QA) pairs for a given question as a first training dataset to train a QA ranking model to build a pre-trained QA ranking model. A generative adversarial network (GAN) includes a generator and a discriminator configured to produce adversarial inputs to provide an updated training dataset. The pre-trained QA ranking model is retrained with the updated training dataset with the bagging adversarial training process. A plurality of trained models is sampled to generate a bagged model ensemble as a final trained QA ranking model for QA ranking tasks.

16 Claims, 13 Drawing Sheets

200A

(56)            References Cited

OTHER PUBLICATIONS

Zhang—EnsembleGAN Adversarial Learning for Retrieval-Generation Ensemble Model on Short-Text Conversation—2019 (Year: 2019).*
Wang 2—Ensembles of Generative Adversarial Networks (Year: 2016).*
Hamdi—Cascading Generative Adversarial Networks for Targeted Imagination (Year: 2018).*
Theis—A Note on the Evaluation of Generative Models (Year: 2016).*
Adversarial Training Can Hurt Generalization (Year: 2019).*

* cited by examiner

| Ques: | How to track California state tax refund? |
|---|---|
| Ans Pool: | ... to track state tax refund, visit ... |
| | ... state tax of California can be ... |
| | ... federal tax refund is not ... |
| Other Ans: | Expected refund for California state tax will be received within six-ten weeks ... |

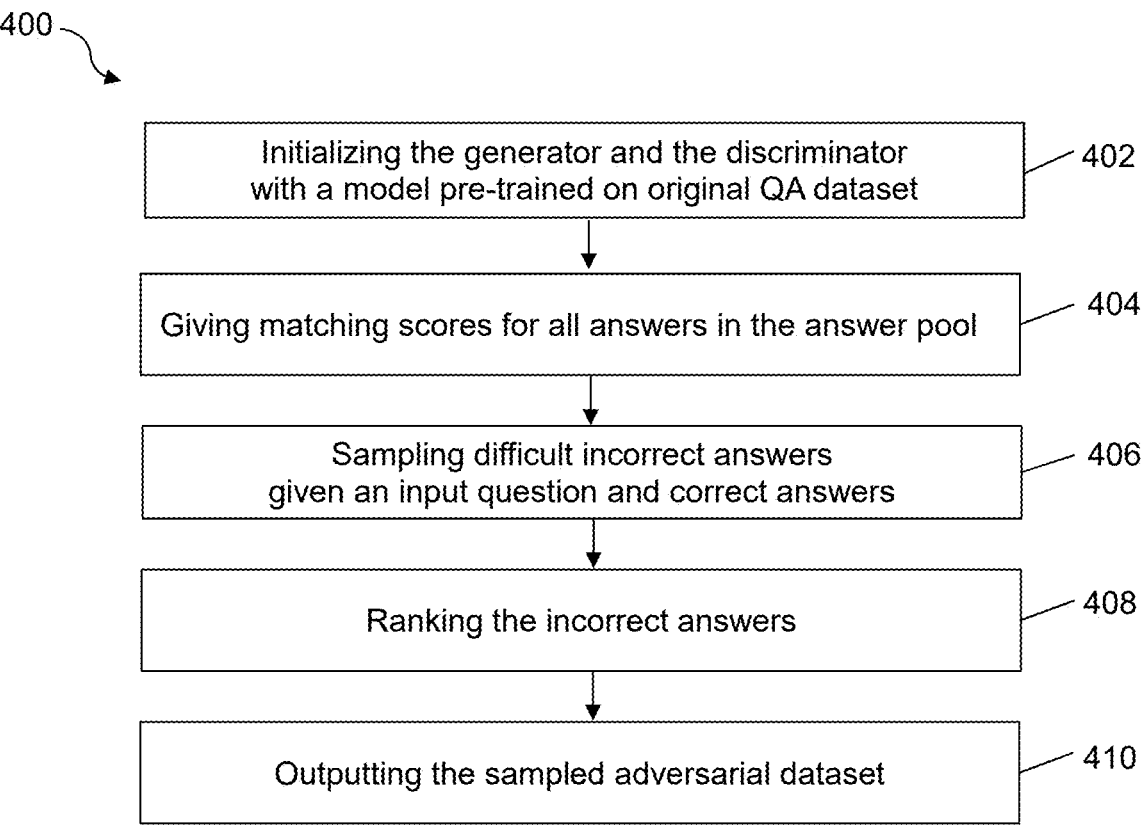

Initializing the generator and the discriminator with a model pre-trained on original QA dataset — 402

Giving matching scores for all answers in the answer pool — 404

Sampling difficult incorrect answers given an input question and correct answers — 406

Ranking the incorrect answers — 408

Outputting the sampled adversarial dataset — 410

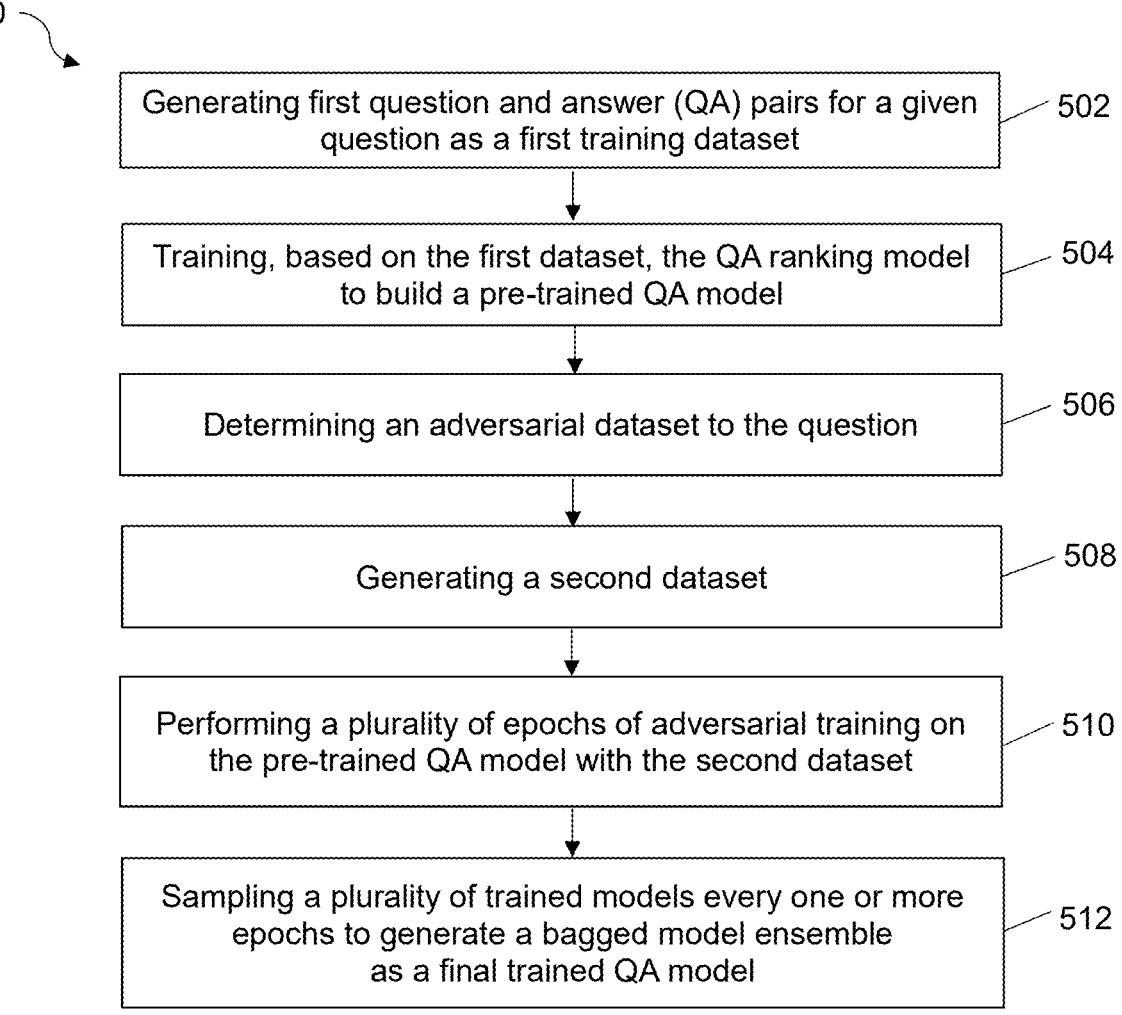

Generating first question and answer (QA) pairs for a given question as a first training dataset — 502

Training, based on the first dataset, the QA ranking model to build a pre-trained QA model — 504

Determining an adversarial dataset to the question — 506

Generating a second dataset — 508

Performing a plurality of epochs of adversarial training on the pre-trained QA model with the second dataset — 510

Sampling a plurality of trained models every one or more epochs to generate a bagged model ensemble as a final trained QA model — 512

FIG. 5

Table 1: Dataset specifications for all the datasets used in experiments

| Dataset | WikiQA | InsuranceQA | FiQA | Tax Domain QA |
|---|---|---|---|---|
| # of QA Pairs (train/dev/test) | 19k / 2.5k / 5.8k | 926k / 724k / 650k | 700k / 300k / 300k | 42k / 14k / 14k |
| Avg length of questions | 6 | 7 | 11 | 18 |
| Avg length of answers | 25 | 95 | 135 | 83 |
| Avg # of candidate answers (train/dev/test) | 38 / 38 / 38 | 50 / 500 / 500 | 50 / 500/ 500 | 25 / 25 / 25 |

FIG. 6

| Model | NDCG@5 | MRR |
|---|---|---|
| Match Pyramid | 0.6628 | 0.6258 |
| + Vanilla Adversarial | 0.6939 | 0.6675 |
| + Adversarial Committee | 0.6987 | 0.6748 |
| Deep Matching Net | 0.6922 | 0.6533 |
| + Vanilla Adversarial | 0.6952 | 0.6692 |
| + Adversarial Committee | 0.7051 | 0.67 |
| MAN | 0.7328 | 0.7134 |
| + Vanilla Adversarial | 0.7337 | 0.711 |
| + Adversarial Committee | 0.7402 | 0.7205 |

| Model | test-1 | test-2 |
|---|---|---|
| Match Pyramid | 0.4571 | 0.4036 |
| + Vanilla Adversarial | 0.5269 | 0.4602 |
| + Adversarial Committee | 0.5307 | 0.4751 |
| Deep Matching Net | 0.6135 | 0.5498 |
| + Vanilla Adversarial | 0.6464 | 0.6007 |
| + Adversarial Committee | 0.688 | 0.625 |
| MAN | 0.7032 | 0.668 |
| + Vanilla Adversarial | 0.6951 | 0.6509 |
| + Adversarial Committee | 0.7267 | 0.6814 |

| Model | NDCG@5 | MRR |
|---|---|---|
| Match Pyramid | 0.3423 | 0.4571 |
| + Vanilla Adversarial | 0.3715 | 0.4859 |
| + Adversarial Committee | 0.3812 | 0.4866 |
| Deep Matching Net | 0.3972 | 0.4963 |
| + Vanilla Adversarial | 0.4114 | 0.5149 |
| + Adversarial Committee | 0.4157 | 0.5191 |
| MAN | 0.4312 | 0.5153 |
| + Vanilla Adversarial | 0.3844 | 0.465 |
| + Adversarial Committee | 0.4601 | 0.5318 |

| Model | Prec@1 |
|---|---|
| Match Pyramid | 0.5767 |
| + Vanilla Adversarial | 0.6437 |
| + Adversarial Committee | 0.6568 |
| Deep Matching Net | 0.6601 |
| + Vanilla Adversarial | 0.6636 |
| + Adversarial Committee | 0.6863 |
| MAN | 0.7927 |
| + Vanilla Adversarial | 0.7975 |
| + Adversarial Committee | 0.8029 |

| Model | MRR (Validation Set) |
|---|---|
| Base Model (MAN) | 0.5123 |
| + Adversarial iteration 1 | 0.4718 |
| + Adversarial iteration 2 | 0.4574 |
| + Adversarial iteration 3 | 0.4728 |
| + Adversarial iteration 4 | 0.4724 |
| + Adversarial iteration 5 | 0.4649 |
| + Adversarial iteration 6 | 0.4552 |
| + Adversarial iteration 7 | 0.4705 |
| + Adversarial iteration 8 | 0.4709 |
| + Adversarial iteration 9 (Adv-MAN) | 0.4518 |

FIG. 8

| Model | NDCG@5 | MRR |
|---|---|---|
| MAN | 0.7328 | 0.7134 |
| Committee Type 1 | 0.6975 | 0.6448 |
| Committee Type 2 | 0.7316 | 0.6985 |
| Committee Type 3 | 0.7331 | 0.7099 |
| Adv-MAN | 0.7337 | 0.711 |
| AdvCom-MAN | 0.7402 | 0.7205 |

FIG. 9

| Model | NDCG@5 | MRR |
|---|---|---|
| MAN | 0.7328 | 0.7134 |
| Bagging MAN Ensemble | 0.7336 | 0.7147 |
| Adv-MAN | 0.7337 | 0.711 |
| AdvCom-MAN | 0.7402 | 0.7205 |

BAGGING ADVERSARIAL TRAINING FOR QUESTION ANSWER RANKING

BACKGROUND

The present disclosure relates to bagging adversarial training for question-answer ranking using neural networks.

Question Answer (QA) ranking, or the task of accurately ranking the best answers to an input question, has been a long-standing research pursuit with practical applications in a variety of domains, such as customer support chat-bots, community question answering portals, and digital assistants, etc. The majority of the recent developments for QA ranking algorithms are based on deep learning techniques. It will be very desirable to provide an efficient training strategy to build more robust and accurate QA models to be used in different systems.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

FIG. 3 is an example table illustrating some example questions in an answer pool according to some embodiments of the present disclosure.

FIG. 4 is a flowchart illustrating an example process configured to generate adversarial training dataset according to some embodiments of the present disclosure.

FIG. 5 is a flowchart illustrating an example process configured to implement the adversarial committee training to build QA models according to some embodiments of the present disclosure.

FIG. 6 shows dataset specifications of some example datasets according to some embodiments of the present disclosure.

FIG. 8 shows effects of vanilla adversarial learning applied to MAN on FiQA validation data according to some embodiments of the present disclosure.

FIG. 9 shows results of evaluating different committee learning methods the base model MAN on WikiQA dataset according to some embodiments of the present disclosure.

DETAILED DESCRIPTION

Figure 1:
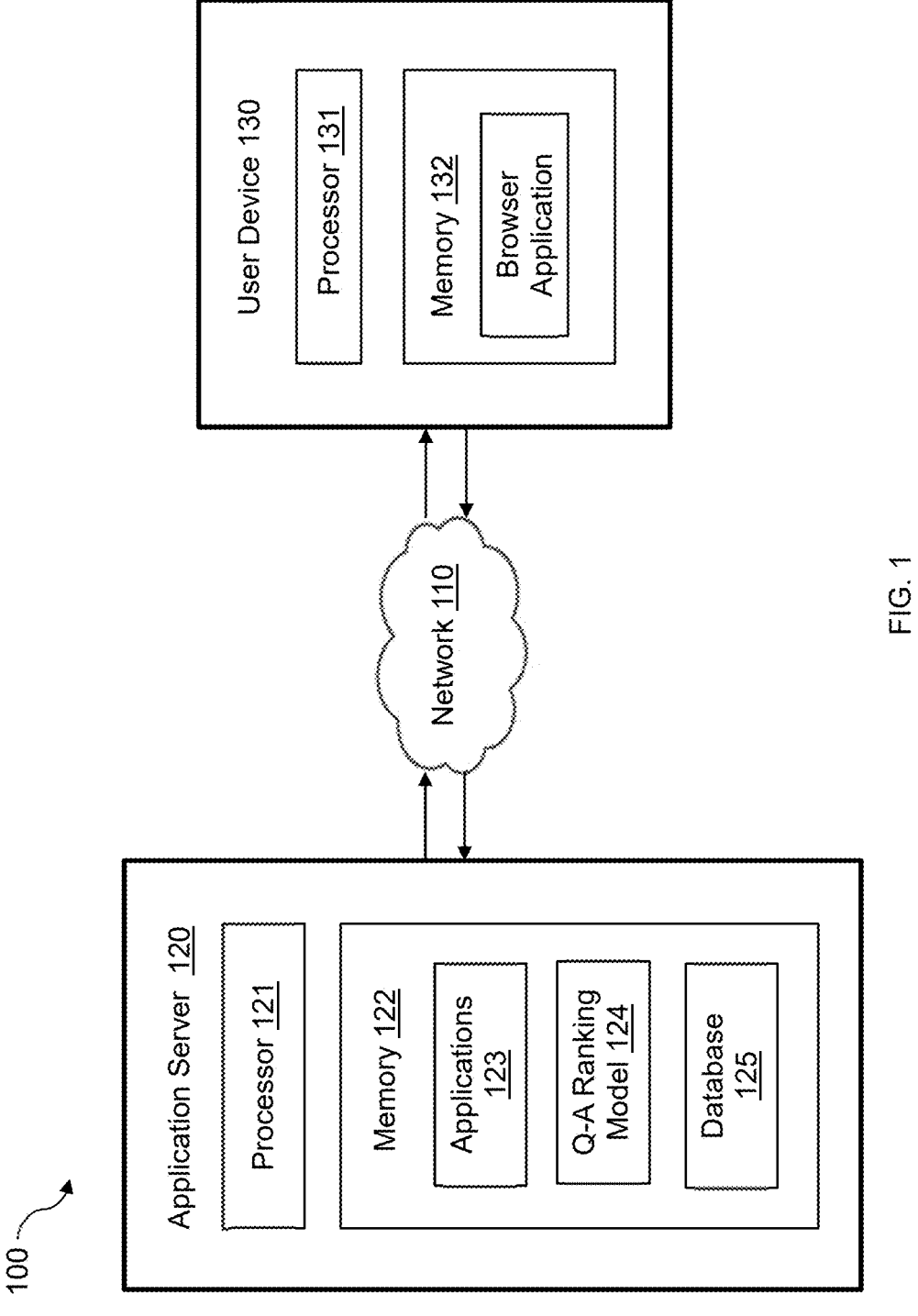
FIG. 1 is an example system according to some embodiments of the present disclosure.

Embodiments of the present disclosure describe techniques of a bagging adversarial training method utilized in adversarial neural networks for training machine learning models in order to provide accurate Question-Answer (QA) ranks with best answers to user input questions.

Adversarial training and Generative Adversarial Networks (GANs) are machine learning techniques and have been successfully applied to natural language processing (NPL).

In the present disclosure, the adversarial training and GANs may generate adversarial data to be used for training and making models more robust or accurate for implementing QA ranking tasks. The adversarial data may be generated to include incorrect or fake answers to given questions to deceive or trick the model learning process. For example, adversarial learning may augment the available training data with adversarial data (e.g., adversarial inputs) to make the trained model robust to confusing candidate answers that are not present in a candidate pool for a given question. If adversarial training is not performed, the model may mistake adversarial data for correct answers when used in unseen question/real-life scenarios. While QA models can be improved with the adversarial training, there are cases where the adversarial training may lead to overfitting to adversarial data and performance degradation. For example, as adversarial training progresses, some models may start overfitting to the adversarial examples in the current batch, and partially forgetting the original training data, which consequently leads to a deterioration of test data ranking performance. Accordingly, it may be desirable to provide a solution which can overcome the overfitting issues observed with the adversarial training, and improve and outperform all baseline QA ranking models.

Embodiments described herein are directed to a system and method to train and generate improved QA ranking models by using a bagging adversarial training strategy. The bagging adversarial training may be applied to train an existing machine learning model to build a trained model for QA ranking tasks while taking context of words into account. The built neural network (e.g., deep learning model) may be implemented as computer programs or application software on one or more computing devices that process user input questions and provide best matching answers in a server-client computing environment.

The embodiments address a computer-centric and Internet-centric problem of improving answer quality and providing best answers by an application server in response to user input questions from user device. For example, the application server may be configured to implement a QA ranking application with a trained QA ranking model. The QA ranking application may be configured to receive user questions from user device and present best answers to a user on a user interface (UI) of user device through at least one network.

In some embodiments, the bagging adversarial training strategy may combine two techniques of adversarial training and statistical bagging. The combination of adversarial training and statistical bagging techniques may allow the training process to produce extremely robust and accurate Question-Answer rankers. The QA ranking model may be a neural network implementing QA ranking algorithms. The QA ranking model may first be trained on an original training dataset obtained from an answer pool stored in a database. The QA ranking model may be trained through multiple iterative processes to build a pre-trained QA ranking model. An GAN may be configured as a generic adversarial learning framework to adapt to the bagging adversarial training to generate adversarial inputs to the original training dataset for further training the pre-trained QA ranking model. The GAN may include a generator neural network (e.g., generator) and a discriminator neural network (e.g., discriminator) which may be coupled with each other and be alternately trained to generate adversarial inputs. The generator may be configured to generate and sample the difficult adversarial examples while the discriminator may learn to rank on increasingly difficult adversarial examples and distinguish the adversarial input samples from the original training dataset.

A bagging adversarial training may be implemented to further train the pre-trained QA ranking model with the adversarial inputs and the original training dataset through multiple iterative processes to generate an ensemble of bagged models. During the bagging adversarial training, the bootstrap sampling and aggregating technique may be utilized to improve the stability of the bagged QA ranking model by improving accuracy and reducing variance, thus reducing or solving the noted overfitting problem. The ensemble of bagged models based on the bagging adversarial strategy may be applied to any types of models and a diversity of datasets. The ensemble of bagged models may provide a stronger boost in model quality performance. The bagging adversarial training may significantly improve the quality of the answers predicted by the trained model. The predicted answers may be displayed on a User Interface (GUI) of the user device to the user searching for particular questions.

The present disclosure provides improved neural networks by training existing neural network and QA ranking algorithms with a bagging adversarial training method and highly diverse datasets. The evaluation results show that the bagging adversarial training strategy may be applied for all types of existing models and the bagging adversarial training strategy overcomes the overfitting issues observed with existing adversarial training.

The present disclosure significantly improves the quality of the answers displayed to the user searching for a particular question in a user interface. The present disclosure improves the QA ranking model training process such that the final trained model may have state-of-the-art ranking performance numbers. The present disclosure provides a novel bagging adversarial learning strategy that boosts the model performance, irrespective of the nature of the model itself. Embodiments described herein may be applied to any type of QA ranking algorithms to provide accurate responses to users inquiries for particular questions in any fields or domains.

As used in this application, "neural network," and "QA ranking model" include, but are not limited to, one or more separate and independent software and/or hardware components of a computer that may be added to a general purpose computer before the computer can receive user input questions from other computers and software and provide best matched answers in order to share data or hardware and software resources among the other computers and software, and computers having such components added thereto.

As used in this application, the "bagging adversarial learning strategy" may be referred to be as "adversarial committee learning strategy" (e.g., adversarial committee) described in various embodiments and illustrated in different tables.

FIG. 1 illustrates an example computing system 100 that may be used to perform QA rankings in response to user request for a given question according to some embodiments of the present disclosure. System 100 may include an application server 120 (e.g., a server computing device), one or more user devices 130 (e.g., client computing devices), and database 125 that may be communicatively connected to one another in a cloud-based or hosted environment by a network 110. Network 110 may include the Internet and/or other public or private networks or combinations thereof.

Application server 120 may include a processor 121, which may be configured to collect and process the data, a memory 122 and a communication interface for enabling communication over network 110. Application server 120 may include one or more applications 123 stored in memory 122 and executed by processor 121 for providing configured application functions, service or hosting a website with particular services for users to visit and obtain information. Applications 123 may include a web application that can be accessed by user device 130 via a browser application 133. Application server 120 may communicate with a plurality of user devices 130 via a network 110 to present high ranking answers in response to questions that the users ask. For example, when some users interact with the TurboTax® software to prepare their tax returns, they may ask questions, view answers and search contextually relevant content, etc. In some embodiments, application server 120 may be configured to implement a QA ranking application 122 with a final trained QA ranking model. The QA ranking application 122 may be configured to receive user questions from user device 130 and present best answers to a user on a user interface (UI) of user device 130 through network 110. Database 125 may store the generated QA data and/or the outcome of the processing by QA ranking application 123.

Application server 120 and user device 130 are each depicted as single devices for ease of illustration, but those of ordinary skill in the art will appreciate that application server 120, and/or user device 130 may be embodied in different forms for different implementations. For example, application server 120 may include a plurality of servers in communication with each other through network 110. Alternatively, the operations performed by application server 120 may be performed on a single server. In another example, a plurality of user devices 130 may communicate with application server 120. A single user may have multiple user devices 130, and/or there may be multiple users each having their own user device(s) 130. User device 130 may be any device configured to present user interfaces and receive user inputs thereto. For example, user device 130 may be a smartphone, personal computer, tablet, laptop computer, mobile device, or other device. User device 130 may include a processor 131, a memory 132, and a browser application 133. Browser application 133 may facilitate user interaction with application server 120 and be configured to transmit information to and receive information from application server 120 via network 110. User device 130 may be any device configured to present user interfaces and receive inputs thereto. For example, user device 150 may be a smartphone, personal computer, tablet, laptop computer, or other device.

Database 125 may be a shared remote database, a cloud database, or an on-site central database. Database 125 may be communicatively coupled to application server 120 to receive instructions or data from and send data to application server 120 via network 110. Database 125 may store an answer pool with a plurality of QA pairs and related QA ranking for the processor 121 to access.

Figure 2A:
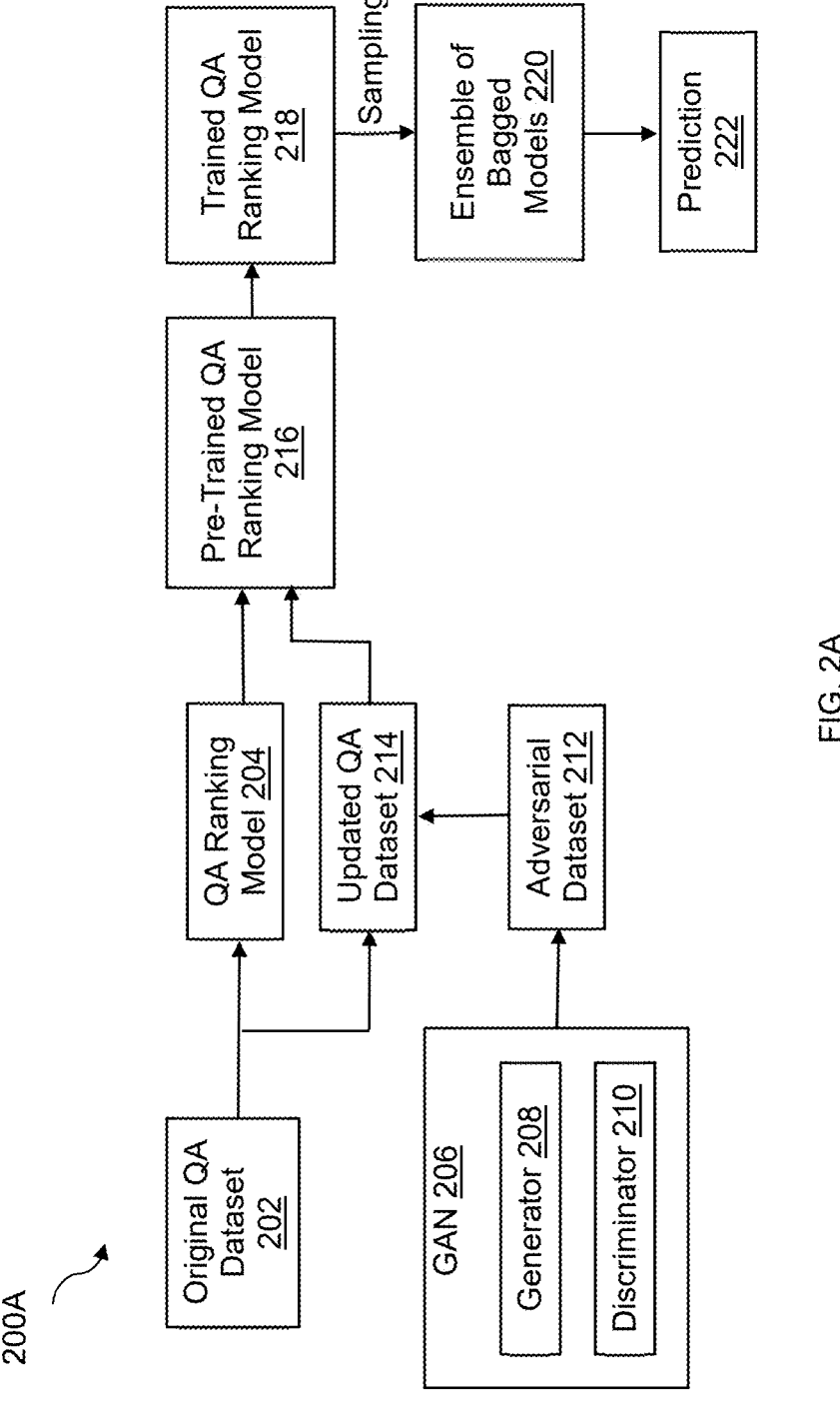
FIG. 2A is a conceptual diagram of a bagging adversarial training system structure configured to perform the QA ranking according to some embodiments of the present disclosure.
Figure 2B:
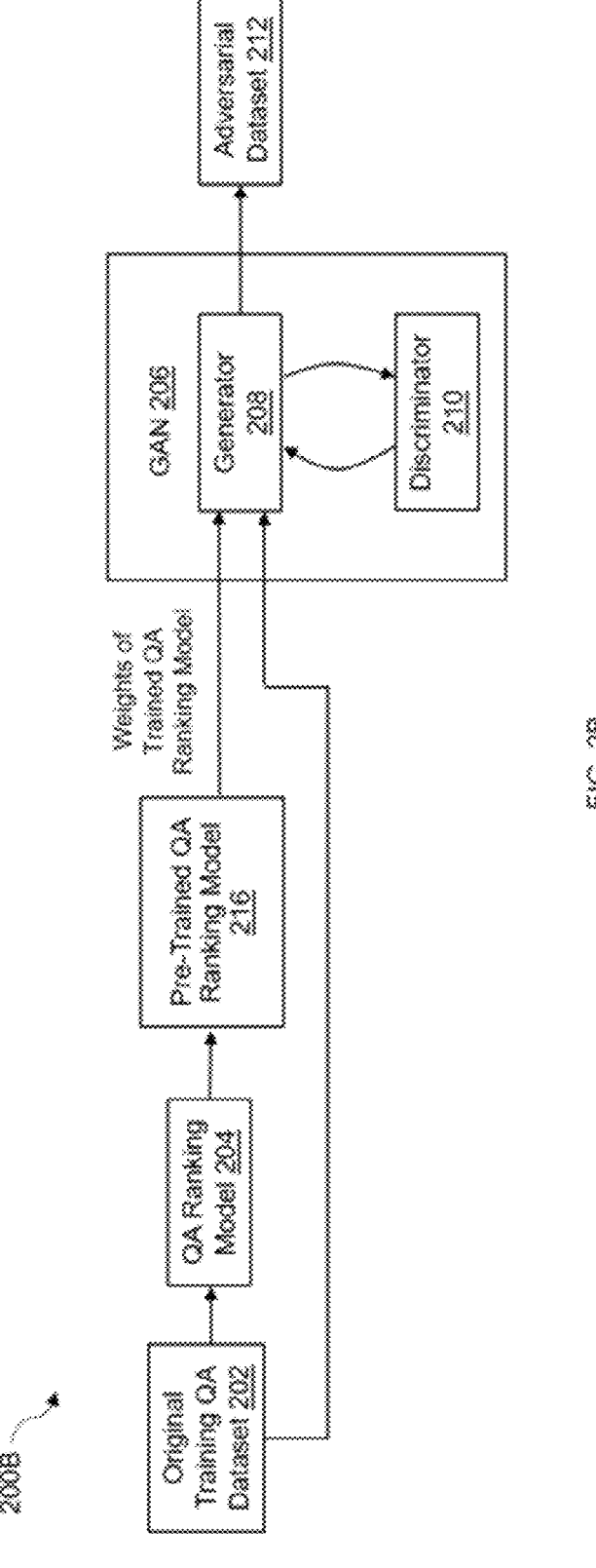
FIG. 2B is a conceptual diagram of generating an adversarial training dataset according to some embodiments of the present disclosure.

FIG. 2A is a conceptual diagram of a bagging adversarial training system structure 200 configured to perform the QA ranking according to some embodiments of the present disclosure. FIG. 2B is a conceptual diagram of generating an adversarial training dataset according to some embodiments of the present disclosure.

In some embodiments, the bagging adversarial training system structure 200 may include a QA ranking model 204, a generative adversarial network (GAN) 206, a pre-trained QA ranking model 216, a trained QA ranking model 218, and an ensemble of bagged models 220. The QA ranking model 204 may be any type of a state-of-the-art model that can perform QA ranking. The neural networks and ranking models may be configured as computer programs (e.g., software) executed on one or more computers, in which the systems, models, algorithms, processes, and embodiments can be implemented as described below.

User questions submitted to websites or software programs may be formed as natural language text. Text elements may include words, phrases, sentences, and paragraphs, etc. Given an input question, an original training data may be selected from an answer pool stored in a database and may represent a plurality of question-answer pairs. The given question may be paired with a plurality of answers from an answer pool. The answers may include labels which may be derived from human annotators or from other sources (e.g., clicks) or indirect signals (e.g., thumbs up, thumbs down). Before being fed into the QA ranking model 204, text of question and answer pairs of the original training data may be preprocessed and transformed into computer readable vectors using any type of word embedding algorithms, such as Global Vectors (GloVe), Word2Vec or fastText, etc. In some embodiments, GloVe algorithm may be used to build semantic word embeddings and vectors for the question and answer pairs of the original training data.

The plurality of answers to the given question may be ranked and labeled with respective similarity scores. For the given question, there may be thousands of answers to be ranked. The best answer may be put on the top of a QA pair list and the worst answer may be put on the bottom of the QA pair list. Each QA pair of the original training data may be represented with respective answer and question vectors to form an original QA dataset 202 as an original or first training dataset. The original QA dataset 202 may include at least one correct answer to the given question and other related (e.g., positive) or unrelated (e.g., negative) answers.

FIG. 3 shows an example table illustrating a part of context of QA ranking including an input question and some related and unrelated questions selected from an answer pool according to some embodiments.

In some embodiments, the QA training data for a particular question may include about 400 relevant answers and 100 irrelevant answers. The question-answer pairs may have associated labels or similarity scores to show how the respective answer is relevant or irrelevant to the given answer. For example, the input question is shown on the first row in the QA ranking context illustrated in FIG. 3. A model trained on the training data alone learns to rank answers by assigning relevance to the type of answers present in candidate answer pool for a given question. The related answers are followed by in the 2nd, 3rd, and 4th rows in the FIG. 3 and may be present in the answer pool in training data for the input question. The 5th row in the QA ranking context may contain an irrelevant answer that is present in the answer pool for a different question in the training data. Each answer in the first QA pairs may originally be labeled with a similarity score indicative of a similarity between the input question and the respective answer.

During prediction, however, there is no answer pool particularly tailored for each input question. In that case, there may be a high chance that the QA ranking model 204 may incorrectly assign more relevance to the answer in last row than actual correct answers due to high lexical similarity and in terms of semantics, the intent of answer shown in the 5th row is to get estimated time of tax refund which aligns somewhat with the given question which wants to track the tax refund. To avoid this issue, the QA ranking model 204 may be trained to deal with similar situations. To improve the accuracy of the QA ranking model, the adversarial training may be used to generate adversarial inputs to train the QA ranking model.

In adversarial training, the generator 208 may be organized with a pre-trained model on an original dataset and it may generate difficult incorrect answers based on the answers it finds most confusing to rank correctly. The present discourse may provide the adversarial training strategy to train the model to deal with cases like this.

As shown in FIG. 2A, to perform a bagging adversarial training, a GAN 206 may be configured to generate adversarial dataset 212 such that the adversarial dataset 212 may be combined with a whole or part of the original training dataset 202 to form an updated QA dataset 214. Further, the updated QA dataset 214 may be fed into the pre-trained QA ranking model 216 and for further training the pre-trained QA ranking model 216.

The processor 121 may train the pre-trained QA ranking model 216 until the model 204 produces a prediction up to a threshold value. The trained QA ranking model 218 may be further sampled to generated an ensemble of bagged models 220. An ensemble of bagged models 220 may be created by sampling multiple trained QA ranking model 218 and may be configured to perform better than the pre-trained ranking model 216.

FIG. 4 is a flowchart illustrating an example process configured to generate an adversarial training dataset according to some embodiments of the present disclosure. The process 400 may be described to represent a sequence of operations that can be performed by one or more computers including hardware, software, or a combination in the above described systems. Thus, the described operations may be performed with computer-executable instructions under control of one or more processors. The order in which the operations are described is not intended to be construed as a limitation, and any number of the described operations can be combined in any order and/or in parallel to implement the process.

Referring to FIGS. 2A and 2B, the GAN 206 may include a generator 208 and the discriminator 210 which may be alternately trained to generate the adversarial dataset 212.

In one embodiment, IRGAN (Information Retrieval Generative Adversarial Networks) may be used as a generic adversarial learning framework to QA pairwise cases, which adapt well to the QA ranking problem. The learning method used in IRGAN may be an adversarial learning method which may be used to generate the adversarial dataset 212. The generator 208 and the discriminator 210 may work as two competing networks which are alternately trained just like a two player minimax game. IRGAN may use the same minimax game idea as GAN but may use different objective functions for the generator and discriminator. In a ranking task setting, the job of generator 208 is to sample difficult incorrect answers given an input question and correct answers for it. The discriminator 210 then may rank this difficult dataset.

At 402, the generator neural network 208 and discriminator neural network 210 of the GAN may be initialized with a pre-trained model 216 on the original QA dataset 202. The pre-trained model 216 may be trained with the same training dataset 202 with described details at step 504. The stored weights (e.g., parameters) of the pre-trained model 216 may be loaded into and initialize the generator 208 and discriminator 210 models.

At 404, given an input question, the generator 208 may be configured to generate matching scores to all answers of the original dataset in the answer-pool with respect to the input question, irrespective of whether the answer was a part of candidate answers for that question in the original dataset or not. The generator 208 may identify a set of incorrect answers to the given question based on the correct answers it finds most confusing to rank the answers correctly. Those incorrect answers are actually irrelevant to the question, but the generator has assigned a high matching score for them. Essentially they are false positives, or answers that the model finds confusing.

At 406, based on this probability distribution, the generator neural network 108 may sample and select K adversarial examples from the set of the identified incorrect answers with high matching scores to form an adversarial training dataset 212. In a ranking task setting, the generator neural network 208 may be configured to sample difficult incorrect answers given an input question and correct answers for it. As the training progresses, the generator neural network 208 may get better at sampling increasingly difficult adversarial negative examples by trying to maximize its reward.

$$p_\theta(d_k|q, r) = \frac{\exp(g_\theta(q, d_k))}{\sum_d \exp(g_\theta(q, d))} \qquad (1)$$

For example, the probability of choosing an answer from the answer-pool may be given by applying a Softmax over the scores for all answers (equation 1). Based on this probability distribution, the generator samples K adversarial examples from the answer-pool, where the summation in denominator may be over all the answers in answer-pool except the correct answers for the input question, $d_k$ is the kth answer in answer-pool, $g_\theta$ is the generator score. Since sampling is a non-differentiable operation, the generator cannot be trained using backpropagation by error signal from the discriminator. Hence, a Reinforcement Learning strategy may be used to train the generator where the objective of the generator is to maximize its reward (equation 2).

$$L_{Gen} - \frac{1}{K}\sum_{k=1}^{K}\log(g_\theta(d_k|q)) \times \text{reward} \qquad (2)$$

At 408, the adversarial training dataset 212 sampled and selected by the generator 208 may be passed to the discriminator 210. The discriminator 210 may learn to rank the adversarial training dataset 212 by minimizing the loss function. The adversarial dataset 212 may be obtained by sampling a number of difficult incorrect candidate answers.

$$\text{reward}=2(\sigma(\text{hinge}(q,a_+,d_k)-0.5) \qquad (3)$$

and $$\text{hinge}(q,a_+,d_k)=\max\{0,M-sim(q,a_+)+sim(q,d_k)\} \qquad (4)$$

At 410, the discriminator 210 may be trained to distinguish the adversarial dataset 212 from the first training dataset 202 and output an adversarial dataset 212. As the training progresses, the generator gets better at sampling increasingly difficult adversarial negative examples by trying to maximize its reward (equation 3). Given this adversarial training data sampled by generator, the discriminator learns to rank this dataset by minimizing the hinge loss (equation 4). This adversarial training process thus boosts the discriminator's performance since after adversarial training the decision boundary of discriminator is fit to original training data, as well as the adversarial data. During prediction, the discriminator trained after adversarial training may be used to get the matching score for the input question-answer pair. This adversarial training process may boost the discriminator's performance since after adversarial training the decision boundary of discriminator is fit to original training dataset, as well as the adversarial dataset.

The GAN 206 may augment the available original training data with adversarial data. For example, the processor 121 may generate the updated dataset 214 with the original QA dataset 204 and the adversarial dataset 212 representing difficult incorrect candidate answers to the given question. For example, the QA data with lower matching scores in the original QA dataset 204 may be replaced with the adversarial dataset 212 to form an updated QA dataset 214. Based on the updated QA dataset 214, the pre-trained QA ranking model 216 may further trained through a bagging adversarial training to create an ensemble of fully trained models to improve the model for predicting ranking answers correctly.

FIG. 5 is a flowchart illustrating an example process 500 configured to implement the bagging adversarial training to build QA models according to some embodiments. The process 500 may be described to represent a sequence of operations that can be performed by one or more computers including hardware, software, or a combination in the above described systems. Thus, the described operations may be performed with computer-executable instructions under control of one or more processors. The order in which the operations are described is not intended to be construed as a limitation, and any number of the described operations can be combined in any order and/or in parallel to implement the process.

At 502, first question and answer (QA) pairs for a given question may be generated to form an original training dataset by the application server 121. For example, there may be 500 QA answer pairs are selected to form an original dataset 202. As described above, a number of labeled QA pairs may be obtained as an original QA dataset 202 based on the ranked QA pairs and may be a fundamental input to the bagging adversarial training system structure 200. The labels of the QA pairs may be relevance or matching scores to indicate a similarity with between a question and corresponding answer of each QA pair.

At 504, by referring to FIG. 2A, the original QA dataset 202 may be fed to the QA ranking model 204. The processor 121 may train the QA ranking model 204 on the original QA dataset 202 through multiple epochs (e.g., iterative processes) to build a pre-trained QA ranking model 216. The QA ranking model 202 may be any type of QA ranking machine learning models with state-of-the-art algorithms, such as a match pyramid, deep matching net, and multi-hop attention network (MAN), etc. In an embodiment, the entire dataset 202 may pass to the same neural network multiple times to optimize the training model through an iterative process with multiple epochs. If one epoch is too big to feed to the model at once, the original QA dataset 202 may be divided into a plurality of smaller batches and take multiple iterations to complete 1 epoch training. The processor 121 may train the model using batches such that it can scale to very large training sets.

A development set may be used to optimize or fine tune the hyper-parameters of the model 204. For example, the original QA dataset (e.g., first dataset) 202 may be passed into the QA ranking model 204 and the corresponding prediction may be returned by the model 204. The model weights may be organized randomly with values close to zero. The model may be trained with a number of epochs, for example, 30 epochs. With new weights obtained in one epoch, the neural network can make new prediction at the next epoch. The processor 121 may train the model 204 to learn, obtain optimal model weights, and determine when to stop the model training process. The epoch to train the learning model may stop when a training loss goes very close to 0. The optimal weights may be saved in an optimization algorithm employed to minimize the training loss with respect to the original QA dataset 202 such that a pre-trained model 216 may be built. The pre-trained model 216 may be executed by the processor 121 to rank candidate answers by assigning relevance to the type of candidate answers present in answer pool for a given question.

At 506, once the first phase training is completed with a pre-trained model 216, an adversarial learning process may be started to retrain the model 216 with adversarial inputs. The processor 121 may be configured to retrain a per-trained model 216 on the updated dataset 214. As described above in step 404, a GAN may be used to generate an adversarial dataset 212 for the given question and the first dataset 202, wherein actual correct questions may be identified, and incorrect questions that the model finds confusing (e.g., due to similarity to correct questions) may also be identified. By repeating this process for every question in the dataset, the GAN may output the adversarial dataset 212 from the confusing incorrect questions.

At 508, an updated or second dataset 214 may be determined to include adversarial dataset 212 obtained through a GAN 206 for further implementing bagging adversarial training on the per-trained model 216. The updated training dataset (e.g., second dataset) 214 may be formed to include adversarial dataset 212 combined with a whole or part of the original QA dataset 202. In some embodiments, the system may select a number of adversarial inputs (e.g., irrelevant or incorrect answers) which are not originally mapped to the question and add the selected adversarial inputs into the first dataset 202 to generate an updated training dataset 214. For example, the system may select a number of adversarial sample inputs and add them to the second training dataset. The model 204 may still consider these particular incorrect answers as relevant answers, although they are not correct answers to the particular question. In an embodiment, the processor may select a set of adversarial dataset 212 to replace a part of the original training QA dataset 204 in the original training set to form and generate the second training dataset 204. The adversarial learning process may use the hardest incorrect examples to confuse the model 204 so that the 204 model may be retrained with better performance.

At 510, the processor 121 may perform a plurality of iterations of adversarial training processes on the pre-trained QA model 216 with the updated datasets 214 with similar procedures as the QA model 204 is originally trained. The process may be repeated with the same training data over multiple times to generate a plurality of trained models.

At 512, during the bagging adversarial training process, the plurality of trained models may be sampled at regular intervals, such as every one or more epochs, to create an ensemble of bagged models. In some embodiments, the processor 121 may sample a plurality of models including the pre-trained model and the fully trained model to create an ensemble of bagged models. After a few rounds of adversarial trainings, an ensemble of bagged models may be generated and may perform better than any other existing ranking model. The sampled models may have decision boundaries that are fit to different proportions of the original QA dataset 202 and the adversarial dataset 212, consequently creating a committee of diverse decision makers to improve the accuracy of the model and avoid overfitting. For example, model assembly may be implemented by averaging the weights of multiple trained models through the same bagging adversarial training process. The final trained model with set of weights may offer a more stable and accurate result. Bagged model ensembles may make the final trained model more robust and stable thus ensuring better performance on providing the best result for a given question in real-time scenarios.

In an embodiment, the weight average prediction may be applied on the ensemble of the bagged models by calculating a matching score between a question and a candidate answer. During prediction, given a question q and a candidate answer a, the matching score (q, a) between them may be computed as shown in equation 4.

$$\text{score } (q, a) = \sum_{i=1}^{N} w_i h_i(q, a) \tag{4}$$

where $h_i$ (q, a) is the matching score between q and a given by ith model, and $w_i$ is the weight assigned to ith model. The weight may be computed by first recording the performance metric (MRR, MAP, NDCG@5, etc.) on the validation dataset for all models, and then normalizing them to 1. These N models may be sampled at regular intervals during the adversarial training process. For example, the models may be sampled at every third epoch to be a part of the ensemble bagged models. The predictions from the above models may be aggregated to make a final combined prediction. This aggregation can be done on the basis of predictions made or the probability of the predictions made by the bootstrapped individual models. In this way, the models may have the best trade-off between ensemble performance and run-time during prediction. The results show that the strategy of the bagging adversarial training may be applied for all types of models and it may overcome the overfitting issues observed with existing adversarial training. Moreover, using this strategy may produce new state-of-the-art results for QA ranking on different QA datasets.

The bagging adversarial learning strategy may boost the model performance, irrespective of the nature of model itself. Embodiments of the present disclosure may provide a comprehensive empirical evaluation on the effects of adversarial training for QA ranking models over multiple QA algorithms and evaluate them with various metrics over numerous different datasets.

The bagging adversarial learning strategy (e.g., adversarial committee learning strategy) may be evaluated with various metrics over numerous different datasets. In the present disclosure, four datasets, 4 datasets may be used to evaluate adversarial committee learning strategy. These 4 datasets may belong to different domains and they may be WikiQA, InsuranceQA, FiQA, and Tax Domain QA datasets. FIG. 6 shows dataset specifications of 4 example datasets.

Datasets

WikiQA open domain question answering dataset has recently become a very popular benchmark for QA ranking systems. For each question, a few Wikipedia pages were selected and sentences from summary paragraph were used as candidate answers. Crowdsourcing platforms were then used to annotate these candidate answers. The data pre-processing steps involved conversion of all words to lower case and removal of punctuations. The question and answer lengths are limited to 10 and 40 tokens respectively.

InsuranceQA open domain question answering dataset has recently released as a large non-factoid QA dataset for insurance domain. The dataset is divided into a training, validation and 2 test sets. The validation and test set have 500 candidate answers for each question, including the correct answers. For the training dataset, incorrect answers are randomly selected from the entire answer pool for every question such that there are 50 candidate answers for each, including the correct answers. Each word in questions and answers is converted to lower case. Punctuation marks in questions and answers are removed. 120 and 150 tokens are used for question and answer respectively.

FiQA is a financial domain non-factoid dataset and was released recently and built by crawling data from Reddit, StockTwits and StackExchange. The words are removed from this data that appear less than 5 times in the corpus and split the data into train, valid and test sets. For each question in training set, a pool of 50 candidate answers are created by including the correct answers and randomly sampling the remaining ones from the answer-pool. For the validation and test data, we create a pool of 500 candidate answers in similar fashion. The maximum lengths for question and answer are limited to 20 and 150 tokens respectively.

Tax Domain QA dataset may be obtained from a popular tax domain question answering platform. Each question had only one correct answer. An answer pool may be created for each question by randomly sampling incorrect answers from the entire collection of answers. The question and answer length is kept at 40 and 180 tokens respectively.

Additionally, many of the answers have links to web pages and most of the relevant information that answers the input question is on the webpage. Since crawling the mentioned webpage and including all text would blow up the answer length, we used a different strategy to deal with such cases. All the links may be collected in corpus, tokenized them and removed the stop words like "www", "com", "php", etc. We used k-means clustering to group the links based on lexical similarity and we extracted important words for each cluster. In the corpus, we replace each link with the words for cluster that link belongs to.

In various embodiments, Normalized Discounted Cumulative Gain (unsupervised learning, e.g., NDCG@5) and Mean Reciprocal Rank (MRR) may be used as main metrics to evaluate the trained ranking models. The base models may be optimized during adversarial training based on these metrics. For situations where each question has only one correct answer, Precision@1 may be used as the main metric instead. On each metric for each dataset, its 95% bootstrap confidence intervals may be computed by sampling one third of the test data results with replacement for 30 times.

Results

FIGS. 7A-7H illustrate evaluation results of adversarial training over different QA baseline models on multiple datasets belong to different domains. Various algorithms and techniques may be used to investigate the use of adversarial training to QA ranking. The example algorithm or QA ranking baselines models may include Match Pyramid, Deep Matching Net, Multihop Attention Network (MAN).

Figures 7A, 7B:
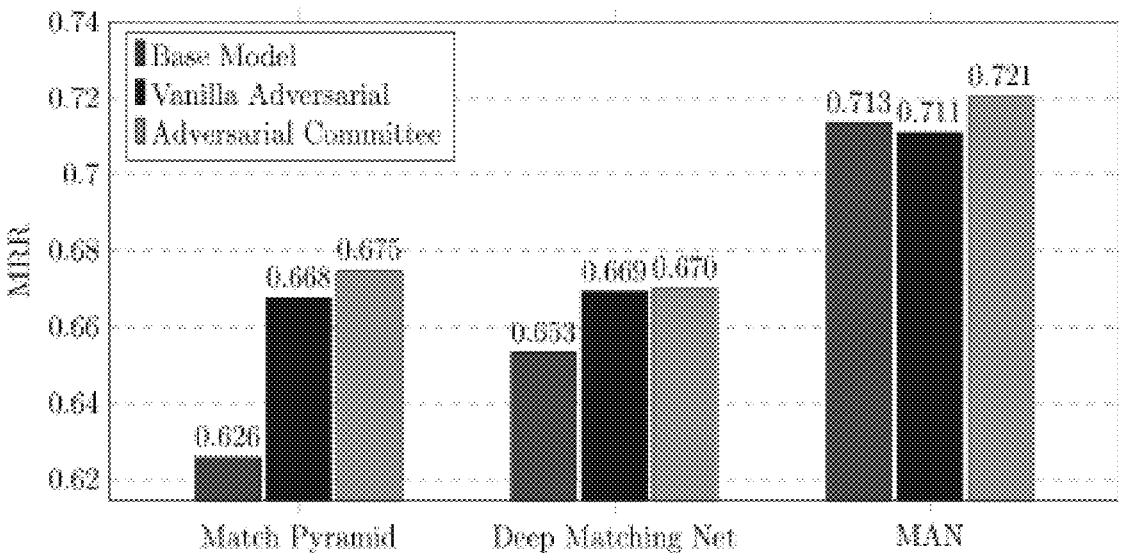
FIGS. 7A-7H illustrates evaluation results of adversarial training over different QA baseline models on multiple datasets belong to different domains according to some embodiments of the present disclosure.

FIGS. 7A-7B illustrate evaluation results on running adversarial training techniques over different QA ranking baseline algorithms on WikiQA dataset.

FIG. 7A shows the results of different models on WikiQA. As can be seen in FIG. 7A, while vanilla adversarial learning improves Match Pyramid and Deep Matching Net, it worsens MAN. Since MAN has a higher capacity, it may overfit to adversarial training samples thereby forgetting some of its knowledge from original dataset. However, Adevrsarial committee learning addresses this issue and improves the performance of base MAN, thus establishing new state-of-the-art standards for QA Ranking on WikiQA. Additionally, it provides a better boost in model performance for Match Pyramid and Deep Matching Net than vanilla adversarial learning. This trend can be seen much clearly in FIG. 7B where performance of all models on MRR on WikiQA has been plotted.

Additionally, as can be seen in FIG. 7B, improvement in Match Pyramid by adversarial committee learning results in an ensemble that performs even better than Deep Matching Net and Adv-Deep Matching Net, even though Deep Matching Net performs better than MatchPyramid. This shows that a committee of MatchPyramid decision makers fit to different proportions of original and adversarial dataset as a result of adversarial committee learning enables the ensemble to consider better ways of comparing and ranking answers than base Deep Matching Net and Adv-Deep Matching Net.

Figures 7C, 7D:
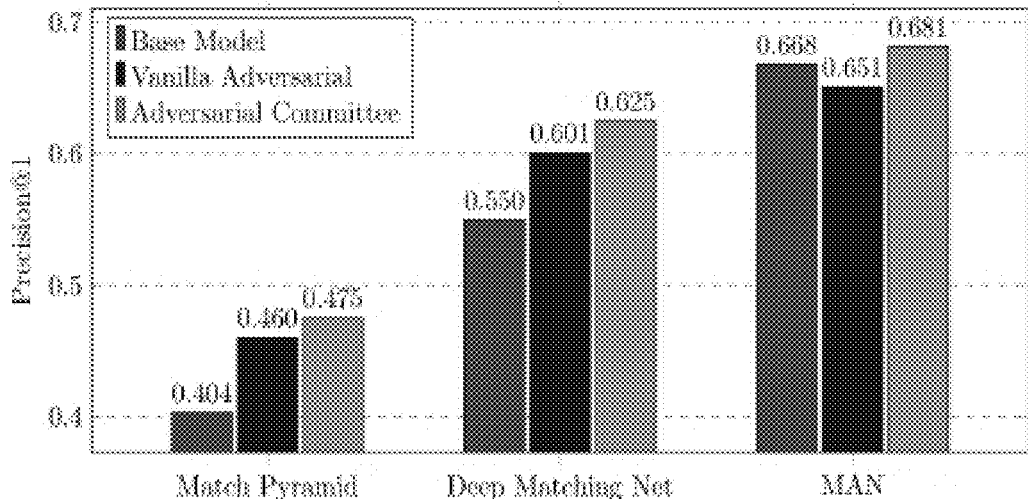

FIGS. 7C-7D illustrate evaluation results on running adversarial training techniques over different QA ranking baseline algorithms on InsuranceQA dataset.

FIG. 7C shows the results on InsuranceQA dataset. The trend is very similar to WikiQA dataset shown in FIG. 7A; application of vanilla adversarial learning reduces the performance of MAN by some amount, but adversarial committee learning overcomes this limitation and improves the model significantly, thus setting state-of-the-art performance on this dataset as well. The results for test-2 have been shown in FIG. 7D to visually illustrate the model performance upon vanilla adversarial learning and adversarial committee learning.

Figures 7E, 7F:
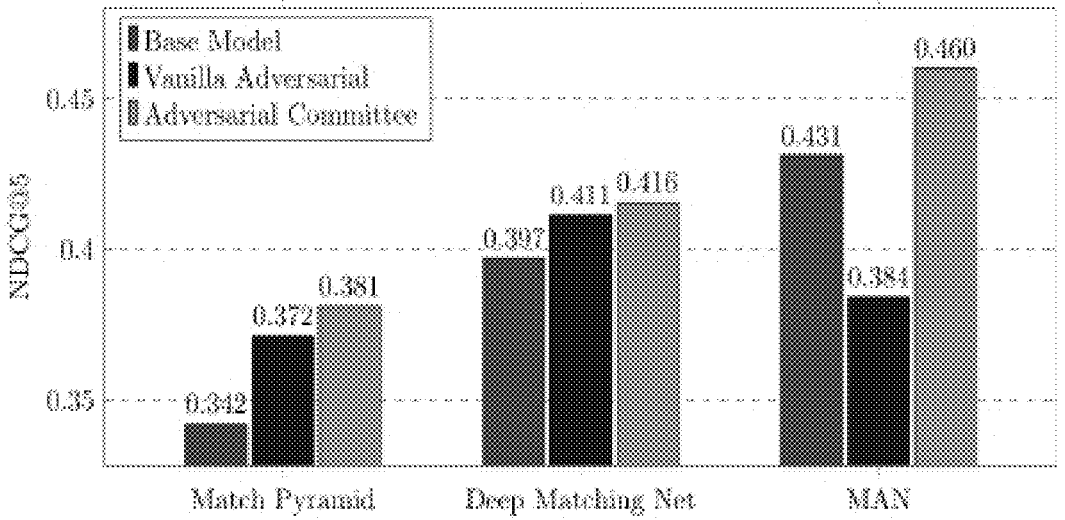

FIGS. 7E-7F illustrate evaluation results on running adversarial training techniques over different QA ranking baseline algorithms on FiQA dataset.

FIG. 7E shows the results on FiQA dataset. For this dataset, applying vanilla adversarial learning reduces the model performance since the model starts overfitting to adversarial data. It is interesting to note that the model performance worsens to such an extent that it performs worse than one of the baseline Deep Matching Nets. This indicates that vanilla adversarial learning can have a huge negative impact on such kind of models. AdvCom-MAN on the other hand has a marked improvement over MAN. FIG.

7F shows the model performance on NDCG@5 for all models on this dataset which makes the results easy to interpret.

Figures 7G, 7H:
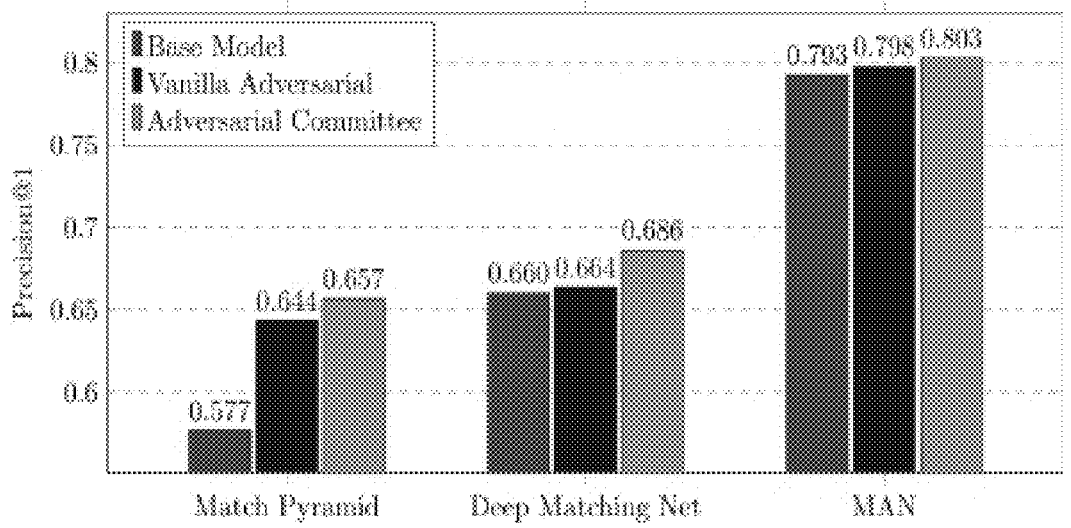

FIGS. 7G-7H illustrate evaluation results on running adversarial training techniques over different QA ranking baseline algorithms on Tax Domain QA dataset.

As can be seen from the results in FIG. 7G, AdvCom-MAN outperforms all other models, thereby being a state-of-the-art model. The base model MAN does not overfit to adversarial data in this case, but improvement by vanilla adversarial learning is not significant. This conveys that effect of vanilla adversarial learning not only depends on the type of model, but also on the type and size of the dataset. Adversarial committee learning improves the model performance significantly which highlights the importance of a committee of diverse decision makers during prediction. These results are also plotted in FIG. 7H.

For all the models, the prefix Adv is used to refer to their variants trained by vanilla adversarial learning, and Adv-Com is used to referred to adversarial committee learning.

Based on the described evaluation results, it is observed that the overall performance of Multihop Attention Network and its variants was the best of the three model types, followed by Deep Matching Network and its variants. Match Pyramid and its variants had the lowest performance scores in general, except for a few anomalous cases where Adv-Com-Match Pyramid performed better than few variants of Deep Matching Network on some of the datasets. Furthermore, the results also show that while vanilla adversarial learning provides a significant boost in model performance for Match Pyramid and Deep Matching Network, the performance boost by adversarial committee learning was much better. Moreover, adversarial committee learning was able to overcome the shortcomings of vanilla adversarial learning in the case of MANs and even increase the performance of MAN models as well.

FIG. 8 shows effects of vanilla adversarial learning applied to MAN on FiQA validation data. The problem can be seen that models with high capacity may tend to overfit to adversarial training data and forget some original training data during vanilla adversarial learning process. Since these models are sampled during vanilla adversarial learning process, it can be seen that their performance gradually worsens on validation data as adversarial training progresses. Moreover, all the models resulting throughout adversarial learning perform significantly worse than base model.

It is worthwhile to note that vanilla adversarial learning, despite its limitations, performs significantly well on the two baselines, such as Match Pyramid and Deep Matching Net. Vanilla adversarial learning method may boost their model's performance significantly. One interesting observation made from these results is that vanilla adversarial learning performed well on the interaction based models, but not on representation based models. This shows that different types of models behave differently in adversarial learning scenarios. On the other hand, adversarial learning committee worked on both the types of models.

Additionally, to study the effect of committee selection methods in general, three different committee learning methods may be tested and evaluated for the base model MAN on WikiQA. FIG. 9 shows results of evaluating different committee learning methods the base model MAN on WikiQA dataset. As shown in FIG. 9, Committee Type 1 (second row) shows the case when models were sampled from early stage of adversarial training, Committee Type 2 (third row) is the case when models are sampled uniformly throughout the adversarial training process and Committee Type 3 (fourth row) denotes the case when models were sampled in later stages of adversarial training (close to convergence). The best committee selection method of these is sampling from models close to convergence, and the resulting ensemble from this method still performs worse than adversarial committee learning thus proving that adversarial committee learning forms a committee of decision makers that is diverse in terms of knowledge from original data and adversarial data, leading to increase in performance.

Figures 10, 11:
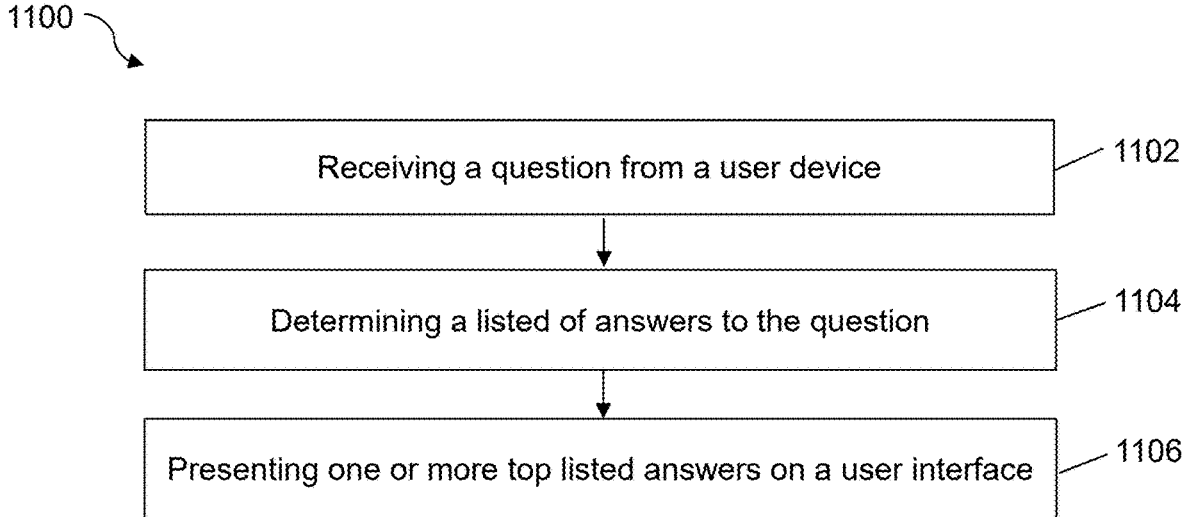
FIG. 10 shows result of comparing adversarial committee learning method with bagging strategy on MAN models according to one embodiment of the present disclosure.
FIG. 11 shows a flowchart illustrating an example process of utilizing a trained QA model in an practical application according to one embodiment of the present disclosure.

FIG. 10 shows results of comparing adversarial committee learning method with bagging strategy on MAN models. In some embodiments, a trained neural network may be a new state-of-the-art model bagging Adversarial Committee, such as Multihop Attention Network (AdvCom-MAN). Bagging strategy may be compared with adversarial committee learning method with bagging strategy on WikiQA. The bagging strategy may involve having different instances of the same model and each of these instances may be trained on a randomly sampled portion of the dataset. For example, a committee of 8 MAN models may be formed using the bagging strategy, each of which was trained on 80% of the training data sampled randomly with replacement. The final committee from adversarial committee learning on WikiQA also had 8 MAN models. Although the bagging strategy may be very close to the adversarial committee strategy (i.e. bagging adversarial strategy), a comparison shown in FIG. 10 demonstrates that the adversarial committee strategy may be a better strategy because adversarial training adds more knowledge to the ensemble than just the original dataset, in addition to having all the benefits of the bagging strategy.

As shown in FIG. 10, Bagging MAN Ensemble corresponds to the bagging committee formed. Bagging MAN Ensemble performs better than MAN on both metrics of NDCG@ and MRR, owing to the known benefits of bagging strategy. Further, FIG. 10 shows Adv-MAN performs better than Bagging MAN Ensemble on NDCG@5, but not on MRR. However, adversarial committee learning (AdvCom-MAN) outperforms the other three models. The adversarial committee learning may be proceed similarly as vanilla adversarial learning, except that instead of using just the model that is obtained after the convergence of adversarial learning, the obtained models throughout the vanilla adversarial learning may be sampled and may form an ensemble (e.g., committee) of the trained models. This shows that the committee of models formed by adversarial committee learning method has all the benefits of bagging plus some additional information form adversarial training set.

Comparing just between vanilla adversarial learning and adversarial committee learning, adversarial committee learning (e.g., bagging adversarial training) is far more efficient since it takes the exact same time as vanilla adversarial learning (the models are sampled during adversarial training) but results in a much better predictor ensemble. The run-time performance during prediction is a bit slower, but the system performs more accurately which makes it much useful in certain industrial applications where high accuracy is paramount. The test and evaluation results may demonstrate bagging adversarial training superiority over the state-of-art algorithms on various known datasets, such as WikiQA, in terms of both model accuracy and in some embodiment, As shown in the evaluation result, the present disclosure utilizes a bagging adversarial strategy by creating a committee of diverse decision makers during adversarial training. The resultant model not only works for all types of models and a variety of datasets, it also provides a stronger boost in model quality performance.

According to the evaluation results and related description, the adversarial training can be used to effectively improve the performance of Question-Answer (QA) Ranking algorithms. The bagging adversarial training process may effectively improve robustness and accuracy of QA ranking of any type of existing machine learning algorithms. For example, the bagging adversarial training process may reach the new state-of-the-art QA ranking performance on several QA ranking tasks that may outperform any previous solution even by as much as 6% on key metrics.

FIG. 11 shows a flowchart illustrating an example process of utilizing a trained QA model in an practical application according to one embodiment of the present disclosure. Embodiments described herein may be utilized in managing a social-based interactive question-answering system based on the system 100 described in FIGS. 1-2. In some embodiments, the final QA trained models described in process 500 may be validated and deployed into a practical application, for example in a server-client computing environment so that users may ask questions and receive best matching answers when users access a social-based interactive question-answering system embedded in an application software or hosted on a commercial website via user computing devices through the network 110.

For example, the users may access an interactive QA interface or QA forum running on an application server hosted on a commercial website (e.g., TurboTax® products or services) to ask questions via user devices through the network. In another example, when some users interact with the TurboTax® software to prepare their tax returns, they may ask questions or view and search contextually relevant content. It may be beneficial to provide the software or an associated online browser application with best matching answers and high quality suggestions. For example, the social-based interactive question-answering system may be a domain specific Community Question Answering (CQA) system such as TurboTax® AnswerXchange. TurboTax users may often prefer self-help to assisted measures and may be able to find and apply their solution faster through self-help. TurboTax self-help content may include curated FAQs and AnswerXchange, a social question-answering system for generating help content. As the users step through the TurboTax interview pages, they can search self-help content or ask a question to seek advice or address a problem encountered in TurboTax.

By referring to FIG. 1, the application server 120 may include a web application 123 stored in memory 122 and executed by processor 121 for managing the social-based questions and answers interface. Applications 123 may include a web application for implementing the trained QA model and various functional machine learning models. An application server 120 and a user device may be communicatively connected to one another in a cloud-based or hosted environment by a network 110. Application 123 may provide particular services for users to access via the user devices 130.

At 1102, the application 123 may receive user text input, such as inquiries and questions regarding products and services from the user interface of the user devices 130. In an embodiment, the application server may receive or record an audio question or inquiry from the user via the audio input/output equipment of the user device, such as a speaker. The application may have a particular application along with hardware/software components to convert the received audio signal to question text.

At 1104, the application server 123 may determine a listed of ranked answers to the questions based on the processing result from the OA ranking model 124. The instructions or algorithms of the built OA ranking model may be validated and transformed to be stored in a computer-readable medium with related computer program instructions operable to cause the computing system to perform operations, such as generating best answers to the user input question. For example, a QA ranking application 123 may be configured to implement on application server 120 to generate ranked answers in response to a user input question.

At 1106, the application server 123 may present one or more top ranked answers on a user interface of a user device 130 through a network 110. Each answer may include at least one or more hyperlinks to web pages and relevant information for the input question. Database 125 may be configured to store the generated QA data and/or the outcome of the processing by QA ranking application 123. Application server 120 may communicate with a plurality of user devices 130 via one or more networks 110 to present high ranking answers in response to questions that the users ask.

In circumstances such as an academic environment, when people work on QA ranking problems, each answer in a test dataset used to evaluate the trained QA model may come with an answer pool that may include labeled correct and incorrect answers. However, in circumstances such as an industry environment, when such a QA model is deployed, the user input questions may not have a well-defined answer pool, and the model may select answers to respective questions from entire collection of answers. There may be a situation wherein the data that the model was trained on did not have all the possible types of "confusing answers" in the candidate answer pool. Thus, answers may be actually incorrect but still syntactically or semantically very similar to the correct answers. This may cause a problem at run time if there are such confusing answers in the entire set of answers. The approach of utilizing a bagging adversarial strategy described herein may be a very good solution to avoid such problems.

Figure 12:
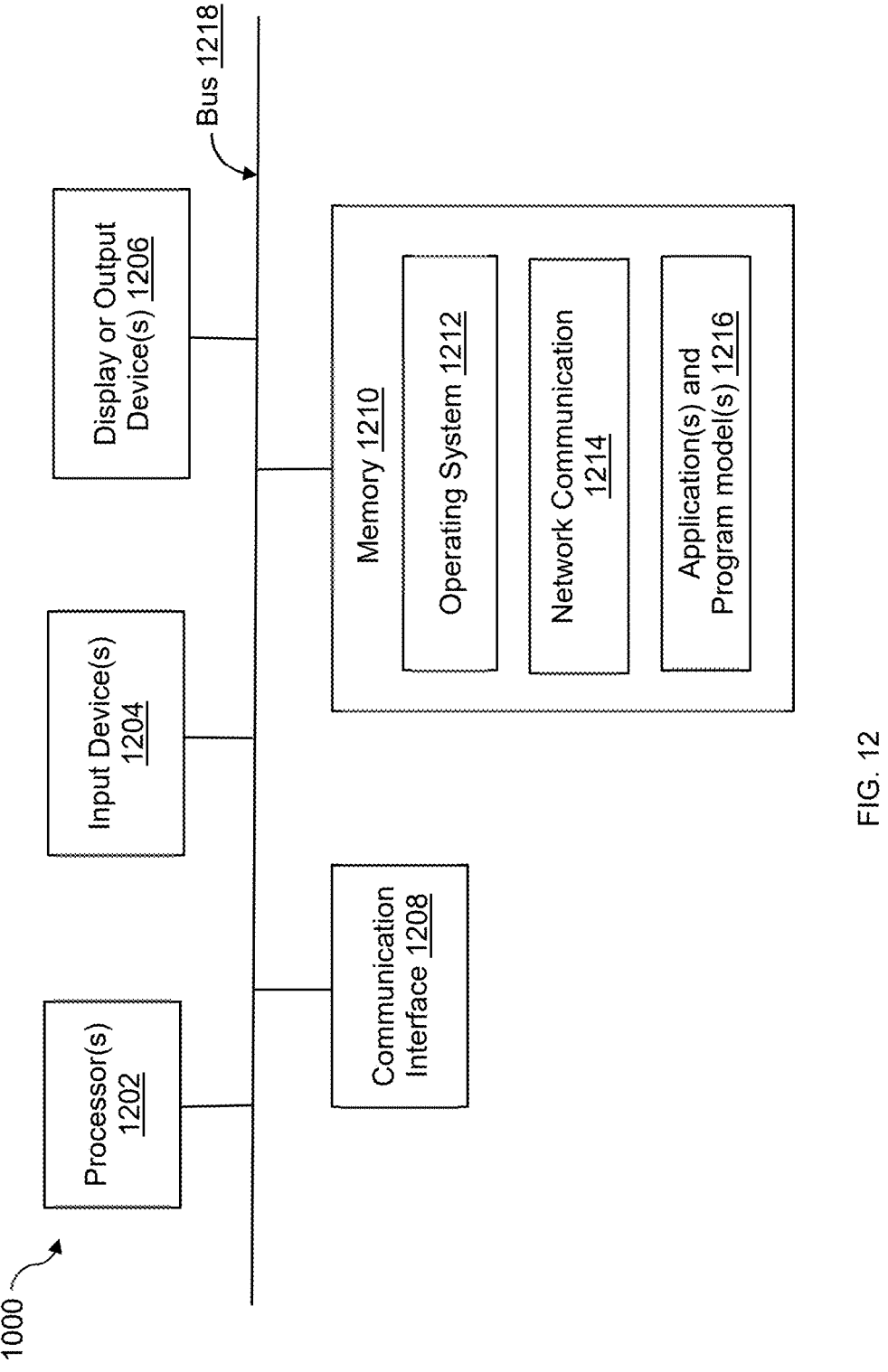
FIG. 12 is a block diagram of an example computing device according to some embodiments of the present disclosure.

Additionally, the embodiments described herein address a computer centric issue of implementing a bagging adversarial strategy to overcome the overfitting issues observed with existing adversarial training methods. The embodiments described herein also improve the technical fields of natural language processing to provide user accurate answers when users interact with an interactive question-answering system and/or a CQA system associated with online software applications or services, online help system, customer support, etc. FIG. 12 is a block diagram of an example computing device 1200 that may be utilized to execute embodiments to implement processes including various features and functional operations as described herein. For example, computing device 1200 may function as application server 110, user device 130 or a portion or combination thereof in some embodiments. The computing device 1200 may be implemented on any electronic device to execute software applications derived from program instructions for neural network system 124 and 200 as illustrated in FIGS. 1-2, and includes but not limited to personal computers, servers, smartphones, media players, electronic tablets, game consoles, email devices, etc. In some implementations, the computing device 1200 may include one or more processors 1202, one or more input devices 1204, one or more display or output devices 1206, one or more communication interfaces 1208, and memory 1210. Each of these components may be coupled by bus

1218, or in the case of distributed computer systems, one or more of these components may be located remotely and accessed via a network.

Processor(s) 1202 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 1204 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1206 such as a CRT (cathode ray tube) or LCD (liquid crystal display) monitor for displaying information to the user and a keyboard and a pointing device such as a mouse or a trackball by which the user can provide input to the computer. Display device 1206 may be any known display technology, including but not limited to display devices using Liquid Crystal Display (LCD) or Light Emitting Diode (LED) technology.

Communication interfaces 1208 may be configured to enable computing device 1200 to communicate with other another computing or network device across a network, such as via a wired connection, a wireless connection, or a combination of wired and wireless connections. For example, communication interfaces 1208 may include an Ethernet interface, an optical interface, a coaxial interface, an infrared interface, a radio frequency (RF) interface, a universal serial bus (USB) interface, a Wi-Fi interface, a cellular network interface, or the like.

Memory 1210 may be any computer-readable medium that participates in providing computer program instructions and data to processor(s) 1202 for execution, including without limitation, non-volatile storage media (e.g., optical disks, magnetic disks, flash drives, etc.), or volatile media (e.g., SDRAM, ROM, etc.). Memory 1210 may include various instructions for implementing an operating system 1212 (e.g., Mac OS®, Windows®, Linux). The operating system may be multi-user, multiprocessing, multitasking, multithreading, real-time, and the like. The operating system may perform basic tasks, including but not limited to: recognizing input from input device 1204; sending output to display device 1206; keeping track of files and directories on memory 1210; controlling peripheral devices (e.g., disk drives, printers, etc.) which can be controlled directly or through an I/O controller; and managing traffic on bus 718. Bus 1218 may be any known internal or external bus technology, including but not limited to ISA, EISA, PCI, PCI Express, NuBus, USB, Serial ATA or FireWire.

Network communications instructions 1214 may establish and maintain network connections (e.g., software applications for implementing communication protocols, such as TCP/IP, HTTP, Ethernet, telephony, etc.).

Application(s) and program models 1216 may include software application(s) and different functional program modules which are executed by processor(s) 1202 to implement the processes described herein and/or other processes. The program modules may include but not limited to software programs, machine learning models, objects, components, data structures that are configured to perform particular tasks or implement particular data types. The processes described herein may also be implemented in operating system 1212.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. Communication between various network and computing devices may be facilitated by one or more application programming interfaces (APIs). APIs of system 1200 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a computing system, the system comprising a processor and a memory having computer-executable instructions stored which, when executed by the processor, cause the processor to perform operations comprising:

generating first question and answer (QA) pairs for a given question as a first dataset, the first dataset comprising labels as a first QA ranking and being stored in a database, the first dataset forming an original training dataset;

training, based on an entirety of the first dataset, a QA ranking model to build a pre-trained QA ranking model;

determining, by a generative adversarial network (GAN), an adversarial dataset to the question;

generating a second dataset, the second dataset comprising the entirety of the first dataset and the adversarial dataset to the question;

performing a plurality of epochs of adversarial training on the pre-trained QA ranking model with the second dataset;

sampling, during bagging adversarial training processes of the pre-trained QA ranking model, a first trained model at a first epoch of the plurality of epochs and a second trained model at a second epoch of the plurality of epochs to generate a bagged model ensemble as a final trained QA ranking model, the second epoch occurring after the first epoch, the first trained model having a first decision boundary to fit a first proportion of the entirety of the first dataset and the adversarial dataset, the second trained model having a second decision boundary to fit a second proportion of the entirety of the first dataset and the adversarial dataset, the first proportion of the entirety of the first dataset and the adversarial dataset having a lower difficulty of the adversarial dataset than the second proportion of the entirety of the first dataset and the adversarial dataset;

performing the bagging adversarial training process until a final decision boundary fits the entirety of the first dataset and the adversarial dataset;

during prediction, computing a matching score between a question and candidate answer as a weighted average of predictions from the bagged model ensemble, wherein weights for the weighted average of predictions of the first trained model and the second trained model in the ensemble are determined by:

recording performance metrics on validation data for the first trained model and the second trained model in the ensemble, and normalizing the performance metrics to determine the weight for each model; and aggregating predictions from the models based on the weights to make a final combined ranking prediction.

2. The method of claim 1, wherein the instructions are further operable to cause the processor to perform the operations comprising applying the final trained QA ranking model on the entirety of the first dataset to predict a second QA ranking.

3. The method of claim 1, wherein each of the labels is indicative of a similarity between the respective answer and the given question.

4. The method of claim 1, wherein the GAN comprises a generator neural network and a discriminator neural network, the generator neural network and the discriminator neural network being initialized with the pre-trained model and the entirety of the first dataset.

5. The method of claim 4, wherein determining the adversarial dataset to the question further comprises:

generating, by the generator neural network, matching scores for all answers in an answer pool stored in the database;

sampling, by the generator neural network, incorrect answers to the question with low matching scores; and ranking, the discriminator neural network, the incorrect answers to obtain the second dataset.

6. The method of claim 5, wherein generating the second dataset further comprises adding the adversarial dataset to the entirety of the first dataset to form the second dataset.

7. The method of claim 1, wherein at least one answer comprises at least one or more hyperlinks to web pages and relevant information associated with the question.

8. A computing system, the computing system comprising a non-volatile memory and a processor coupled to a memory having computer-executable instructions stored which, when executed by the processor, causes the system to perform operations comprising:

generating first question and answer (QA) pairs for a given question as a first dataset, the first dataset comprising labels as a first QA ranking and being stored in a database;

training, based on an entirety of the first dataset, a QA ranking model to build a pre-trained QA ranking model;

determining, by a generative adversarial network (GAN), an adversarial dataset to the question;

generating a second dataset, the second dataset comprising the entirety of the first dataset and the adversarial dataset to the question;

performing a plurality of epochs of adversarial training on the pre-trained QA ranking model with the second dataset;

sampling, during bagging adversarial training processes of the pre-trained QA ranking model, a first trained model at a first epoch of the plurality of epochs and a second trained model at a second epoch of the plurality of epochs to generate a bagged model ensemble as a final trained QA ranking model, the second epoch occurring after the first epoch, the first trained model having a first decision boundary to fit a first proportion of the entirety of the first dataset and the adversarial dataset, the second trained model having a second decision boundary to fit a second proportion of the entirety of the first dataset and the adversarial dataset, the first proportion of the entirety of the first dataset and the adversarial dataset having a lower difficulty of the adversarial dataset than the second proportion of the entirety of the first dataset and the adversarial dataset;

performing the bagging adversarial training process until a final decision boundary fits the entirety of the first dataset and the adversarial dataset;

during prediction, computing a matching score between a question and candidate answer as a weighted average of predictions from the bagged model ensemble, wherein weights for the weighted average of predictions of the first trained model and the second trained model in the ensemble are determined by:

recording performance metrics on validation data for the first trained model and the second trained model in the ensemble, and normalizing the performance metrics to determine the weight for each model; and aggregating predictions from the models based on the weights to make a final combined ranking prediction.

9. The computing system of claim 8, wherein the system is further caused to apply the final trained QA ranking model on the entirety of the first dataset to predict a second QA ranking.

10. The computing system of claim 8, wherein each of the labels is indicative of a similarity between the respective answer and the given question.

11. The computing system of claim 8, wherein the GAN comprises a generator neural network and a discriminator neural network, the generator neural network and the discriminator neural network being initialized with the pre-trained model and the entirety of the first dataset.

12. The computing system of claim 11, wherein determining the adversarial dataset to the question further comprises:

generating, by the generator neural network, matching scores for all answers in an answer pool stored in the database;

sampling, by the generator neural network, incorrect answers to the question with low matching scores; and ranking, the discriminator neural network, the incorrect answers to obtain the second dataset.

13. The computing system of claim 12, wherein generating the second dataset further comprises adding the adversarial dataset to the entirety of the first dataset to form the second dataset.

14. The computing system of claim 8, wherein at least one answer comprises at least one or more hyperlinks to web pages and relevant information associated with the question.

15. The computing system of claim 8, wherein the plurality of pre-trained model is trained and sampled every 3 epochs to generate a fully trained QA model.

16. A method implemented by a computing system, the computing system comprising one or more processors and one or more computer-readable storage devices storing computer-executable computer instructions, the method comprising executing the instructions thereby causing the computing system to perform operations comprising:

generating first question and answer (QA) pairs for a given question as a first dataset, the first dataset comprising labels as a first QA ranking and being stored in a database;

training, based on an entirety of the first dataset, a QA ranking model to build a pre-trained QA ranking model;

determining, by a generative adversarial network (GAN), an adversarial dataset to the question;

generating a second dataset, the second dataset comprising the entirety of the first dataset and the adversarial dataset to the question;

performing a plurality of epochs of adversarial training on the pre-trained QA ranking model with the second dataset;

sampling, during bagging adversarial training processes of the pre-trained QA ranking model, a first trained model at a first epoch of the plurality of epochs and a second trained model at a second epoch of the plurality of epochs generate a bagged model ensemble as a final trained QA ranking model, the second epoch occurring after the first epoch, the first trained model having a first decision boundary to fit a first proportion of the entirety of the first dataset and the adversarial dataset, the second trained model having a second decision boundary to fit a second proportion of the entirety of the first dataset and the adversarial dataset, the first proportion of the entirety of the first dataset and the adversarial dataset having a lower difficulty of the adversarial dataset than the second proportion of the entirety of the first dataset and the adversarial dataset;

performing the bagging adversarial training process until a final decision boundary fits the entirety of the first dataset and the adversarial dataset;

during prediction, computing a matching score between a question and candidate answer as a weighted average of predictions from the bagged model ensemble, wherein weights for the weighted average of predictions of the first trained model and the second trained model in the ensemble are determined by:

recording performance metrics on validation data for the first trained model and the second trained model in the ensemble, and normalizing the performance metrics to determine the weight for each model;

aggregating predictions from the models based on the weights to make a final combined ranking prediction; and outputting a top ranked answer based on the final combined ranking prediction.

* * * * *